United States Patent
Takami et al.

(10) Patent No.: US 6,697,131 B2
(45) Date of Patent: Feb. 24, 2004

(54) STACKED TYPE REFLECTION LIQUID CRYSTAL DISPLAY AND METHOD FOR PRODUCING THE SAME

(75) Inventors: Manabu Takami, Fukushima-ken (JP); Masaharu Okafuji, Shiga-ken (JP)

(73) Assignee: Nanox Corporation, Fukushima-ken (JP)

(*) Notice: Subject to any disclaimer, the term of this patent is extended or adjusted under 35 U.S.C. 154(b) by 96 days.

(21) Appl. No.: 10/072,005

(22) Filed: Feb. 7, 2002

(65) Prior Publication Data

US 2002/0109812 A1 Aug. 15, 2002

(30) Foreign Application Priority Data

Feb. 13, 2001 (JP) ........................... 2001-035790

(51) Int. Cl.[7] ..................... G02F 1/1347; G02F 1/1335; G02F 1/1345
(52) U.S. Cl. .................... 349/74; 349/113; 349/149; 349/150
(58) Field of Search .............. 349/73, 74, 113, 349/149, 150

(56) References Cited

U.S. PATENT DOCUMENTS

| | | | | |
|---|---|---|---|---|
| 4,443,065 A | * | 4/1984 | Funada et al. | 349/76 |
| 4,941,737 A | * | 7/1990 | Kimura | 349/76 |
| 5,090,794 A | * | 2/1992 | Hatano et al. | 349/78 |
| 5,264,952 A | * | 11/1993 | Fukutani et al. | 349/78 |
| 6,184,951 B1 | * | 2/2001 | Harrold et al. | 349/74 |

FOREIGN PATENT DOCUMENTS

| | | | |
|---|---|---|---|
| JP | 63-184724 | * | 7/1988 |
| JP | 09-269498 | | 10/1997 |
| JP | 10-206882 | | 8/1998 |
| JP | 11-160725 | | 6/1999 |
| JP | 2000-193954 | | 7/2000 |
| JP | 2000-199895 | | 7/2000 |
| JP | 2001-033807 | | 2/2001 |

OTHER PUBLICATIONS

Patent Abstracts of Japan, Applicant: Fuji Xerox Co. Ltd, "Reflection Type Liquid Crystal Display Device", Date of filing: Mar. 16, 1999, Application No.:11070221, Publication No.: 2000267071 A, Inventor: Kakinuma Takeo.

* cited by examiner

*Primary Examiner*—Tarifur R. Chowdhury
(74) *Attorney, Agent, or Firm*—Intellectual Property Law Group LLP; Otto O. Lee; Juneko Jackson

(57) ABSTRACT

The present invention provides an inexpensive stacked type reflection liquid crystal display, which can be obtained by stacking two liquid crystal display panels, and a method for producing the same, wherein a two-layered type reflection liquid crystal display is produced, having a blue display panel 10 and a yellow display panel 20 stacked therein, which is provided with segment electrodes 5a and 5a', common electrodes 5b and 5b', and glass substrates 1, 2, 1' and 2' in a state where two liquid crystal layers 3 and 3', the selected and reflection wavelengths of which are mutually different from each other, are placed therebetween. The fluctuation characteristics of the reflectivity with respect to drive voltages of two liquid crystal layers 3 and 3' are adjusted so that these characteristics are made coincident with each other. Segment electrodes 5a and 5a' of the display panels 10 and 20 are made electrical connecting to each other by using an FPC having flexibility while the common electrodes 5b and 5b' are made electrical connecting by an FPC. Voltage drive circuits each consisting of a single system is provided, which supply a voltage to respective electrodes 5a, 5a', 5b and 5b' via the FPCs 40 and 50.

14 Claims, 13 Drawing Sheets

STACKED TYPE REFLECTION LIQUID CRYSTAL DISPLAY AND METHOD FOR PRODUCING THE SAME

DETAILED DESCRIPTION OF THE INVENTION

The present invention relates to a reflection liquid crystal display (LCD) using cholesteric liquid crystal, chiral nematic liquid crystal or liquid crystal in which these liquid crystals are blended, or holographic polymer dispersed liquid crystal.

It is strongly desired that a liquid crystal display having less power consumption is developed as a liquid crystal display (LCD) that is used for a portable telephone and a portable information terminal, whose technology has been remarkably progressed. Therefore, a display panel of a reflection liquid crystal display not requiring any back light has been actively developed. A reflection liquid crystal display of a TN system or STN system in which two polarization plates are used has been employed for watches and electronic calculators since previously. Also, a reflection liquid crystal display of a TFT system has been developed, in which the STN system and TN system that has reduced the number of polarization plates to one by disposing a reflection electrode which suppresses optical absorption by polarization plates.

Further, an STN birefringence ECB system LCD for color display, etc., has been developed, which does not employ a color filter having large optical absorption. Still further, as those in which no polarization plate and no color filter are used, a liquid crystal display has been developed, in which a guest host (GH), a holographic polymer dispersed liquid crystal (HPDLC), cholesteric liquid crystal and chiral nematic liquid crystal are used.

A reflection liquid crystal display, in which cholesteric liquid crystal, chiral nematic liquid crystal, or blended liquid crystal of these types of liquid crystal, or holographic polymer dispersed liquid crystal is used, utilizes Bragg's reflection depending on a cyclic structure of a refractive index of liquid crystal layers.

Wavelength $\lambda$ of the above-described Bragg's reflection is expressed by:

$$\lambda = n \cdot p$$

where n is a mean refractive index of a liquid crystal layer, and p is a cycle of a refractive index.

Therefore, it is possible to produce a color LCD by stacking liquid crystal display panels having three reflection colors of RGB.

Also, in the present specification, a section of liquid crystal corresponding to respective pixels is defined to be a "liquid crystal cell", a liquid crystal portion that expresses a picture brought about by aggregation of pixels displayed in the corresponding liquid crystal cells is defined to be a "liquid crystal display panel" (including a transparent substrate which is an obvious structure), and those including the corresponding liquid crystal panel, its drive circuit, and its control circuit are defined to be a "liquid crystal display (LCD)".

SUMMARY OF THE INVENTION

However, in order for the color LCD to use the above-described three liquid crystal display panels, production costs are made remarkably expensive. Recently, there is a use for a black and white display in an electronic book, etc. However, as regards a liquid crystal display panel that utilizes Bragg's reflection, it is based on a reflection display principle, in which display panels, respectively, reflecting light of wavelengths being in a relationship of two or more complementary colors are stacked to display in terms of black and white. Therefore, it is very difficult to display black and white by a single panel. As a trial, a liquid crystal display using the following liquid crystal is taken into consideration.

(1) Reflection wavelength band width $\Delta\lambda$ is expressed by $$\Delta\lambda = \Delta n \cdot p$$

where $\Delta n$ is a difference in the refractive index, and p is a cycle of the refractive index.

Black and white display can be achieved by making the reflection wavelength band width large by using two or more liquid crystals whose refractive index difference $\Delta n$ is increased. However, the display image becomes only a white reflection color, which is not satisfactory as a black and white display image.

(2) As regards cholesteric liquid crystal, chiral nematic liquid crystal or a mixture of these types of liquid crystal, polymer networks are formed in the liquid crystal, and helical axes of liquid crystal particles are disordered, whereby black and white display is achieved by widening the reflection wavelength band width. That is, there is a PSCT (Polymer Stabilized Cholesteric Texture).

But, in a liquid crystal display employing the liquid crystal referred to in (1) or (2) described above, it is very difficult to obtain a complete black and white display image. Also, in the three-layered type full color LCD, it is very expensive to obtain a complete black and white display image.

An example was reported, which showed a liquid crystal display capable of displaying four colors consisting of white, black, yellow and blue by stacking a liquid crystal display panel that reflects yellow and a liquid crystal display panel that reflects blue, which are in a relationship of complementary colors. However, since it becomes necessary to provide two liquid crystal display panels and a voltage drive circuit for the respective liquid crystals, the display becomes expensive in comparison with the number of colors that can be displayed.

An object of the present invention is to provide an inexpensive lamination type reflection liquid crystal display, which is obtained by stacking two liquid crystal display panels, and a method for producing the same.

The above-described object of the present invention can be solved by the following inventions (1), (2) and (3).

(1) A reflection liquid crystal display including two liquid crystal layers having selected reflection wavelengths differing from each other, and two pairs of liquid crystal display panels provided with a pair of transparent electrodes between which the respective liquid crystal layers are placed, and being obtained by stacking the two pairs of liquid crystal display panels; wherein voltage supply between a pair of electrodes of one liquid crystal display panel and voltage supply between a pair of electrodes of the other liquid crystal display panel are composed of a common voltage drive circuit.

It is preferable that the selected reflection wavelengths of the two liquid crystal layers in the reflection liquid crystal display according to the present invention are made in the relationship of complementary colors, and the color tone of the reflection light is made into black and white colors. In addition thereto, it is possible to obtain reflection light of a desirable color tone other than black and white by adequately selecting the selected reflection wavelengths of two liquid crystal layers.

Also, the liquid crystal layers can employ any one of cholesteric liquid crystal, chiral nematic liquid crystal, mixture of them and holographic polymer dispersion liquid crystal.

Chiral nematic liquid crystal may be independently employed as the above-described liquid crystal layer, or a mixture containing chiral nematic liquid crystal may be used. Also, a composite material including chiral nematic liquid crystal and other materials may be used as a liquid crystal layer. It is preferable that, as the chiral nematic liquid crystal, a compound showing a cholesteric phase as a single body, for example, a liquid crystal compound such as cholesteryl nanoate having an asymmetric center, etc., or that showing a cholesteric phase by blending a chiral agent to nematic liquid crystal, is used.

Also, a biphenyl-based, phenylcyclohexane-based, cyclohexyl cychlohexane-based, or pyrimidine-based liquid crystal compound may be independently employed, or nematic liquid crystal composed of a mixture of these liquid crystal compounds may be employed.

As the above-described chiral agent, a compound showing a cholesteric phase as a single body or an optically-activated organic compound showing a cholesteric phase by being blended with nematic liquid crystal although not showing any cholesteric phase as a single body, etc., may be used. As the optically-activated chiral agent, there is a compound similar to nematic liquid crystal, etc., such as an optically-activated ester derivative, an optically-activated cyanobiphenyl derivative, or an optically-activated bisphenol derivative.

Also, low-molecular weight liquid crystal or polymer weight liquid crystal may be used as the chiral nematic liquid crystal. In addition, a mixture which the former two are blended together, may be used. Where a sufficient self-holding property cannot be obtained in a case where the chiral nematic liquid crystal is independent, various types of solid grains are blended, and chiral nematic liquid crystal may be used as a surrounding spacer. As the spacer material, a rod-shaped or spherically-shaped glass substrate and plastic, or a columnar solid may be used.

A holographic polymer dispersion liquid crystal may be used as the above-described liquid crystal layer.

Also, by adjusting the fluctuation characteristics of a reflection ratio with respect to a drive voltage supplied between a pair of electrodes of the above-described two liquid crystal layers so that the characteristics become substantially identical to each other or almost the same, two sets of liquid crystal display panels may be stacked.

By varying the thickness of mutual liquid crystal layers, a type of nematic liquid crystal and chiral agent, and a blending ratio of the nematic liquid crystal and chiral agent, it is possible to make the drive characteristics of two liquid crystal layers, that is, the reflection characteristics with respect to a voltage supplied between a segment electrode and a common electrode of a liquid crystal display panel identical to each other, or almost the same.

The thickness of a liquid crystal layer having a larger rise voltage in the fluctuation characteristics of the above-described reflection ratio when the thickness of the two liquid crystal layers is made the same is adjusted to be thinner than that of the other liquid crystal layer having a lower rise voltage in the fluctuation characteristics of the above-described reflection ratio, whereby the same substance may be used for liquid crystal materials and a chiral agent, which constitute the two liquid crystal layers. Therefore, a liquid crystal insertion facility, etc., can be commonly used for two liquid crystal display panels, and there is an advantage in improving production efficiency of LCDs.

According to the method for adjusting the fluctuation characteristics of a reflection ratio with respect to a drive voltage of the above-described two liquid crystal layers by varying the type of the above-described nematic liquid crystal and chiral agent and/or its mixture ratio, since it is possible to keep constant the thickness of the respective liquid crystal cells in a liquid crystal display panel, into which liquid crystal is filled, the relationship with respect to complementary colors of the two liquid crystal display panels can be finely adjusted, wherein it is possible to minutely adjust the colors of the liquid crystal display image in a wide range from white to gray.

Also, the fluctuation characteristics of the reflection ratio with respect to the above-described drive voltage can be adjusted by providing a fixed or variable resistor in a voltage drive circuit of a liquid crystal layer having a smaller rise voltage in the above-described fluctuation characteristics of the reflection ratio. According to the adjusting method employing the variable resistor, since an external resistor electrically adjusts the fluctuation characteristics, there is a shortcoming in view of additional need of electric components. However, where there is unevenness when producing two liquid crystal display panels, the allowance thereof can be increased. Further, if a resistor element is a variable resistor element, it is possible to minutely adjust the characteristics of the reflection ratio to voltage in each of the liquid crystal displays.

(2) A reflection liquid crystal display including two liquid crystal layers having selected reflection wavelengths differing from each other; a pair of transparent electrodes consisting of segment electrodes and common electrodes between which the respective liquid crystal layers are placed; and two sets of liquid crystal display panels provided with a pair of transparent substrates between which the pair of transparent electrodes are placed; and being obtained by stacking respective segment electrodes and common electrodes of the two sets of liquid crystal display panels so as to be disposed at positions parallel to each other; wherein the reflection liquid crystal layer further comprises an electrical connecting means for connecting the segment electrodes of the respective liquid crystal display panels to each other; an electrical connecting means for connecting the common electrodes of the respective liquid crystal display panels to each other; and a voltage drive circuit of a single system, which supplies a voltage between the respective segment electrodes and common electrodes via the two electrical connecting means.

A flexible material, for example, FPC (Flexible Printed Circuit) may be used as the electrical connecting means.

Also, an overlapping plane of adjacent transparent substrates of the two sets of liquid crystal display panels are adhered to each other with an adhesive agent whose refractive index is almost the same as the refraction index of the transparent substrate, wherein a reflection loss on the overlapping plane of the above-described transparent substrates is reduced, and it is possible to increase the amount of light entering the liquid crystal cells in the second liquid crystal display panel when being observed from the light incident side, whereby image display having a desired color tone and a large contrast can be obtained.

In addition, by making the fluctuation characteristics of a reflection ratio with respect to a drive voltage identical to each other or almost the same on liquid crystal display by the construction of the present invention (2), it is possible to commonly use a voltage drive circuit that drives the respective segment electrodes and common electrodes of the two sets of liquid crystal display panels.

(3) A method for producing a reflection liquid crystal display, comprising the steps of: electrically connecting segment electrodes and common electrodes of the respective liquid crystal display panels, by flexible conductive materials, the respective liquid crystal display panels being composed of a first liquid crystal display panel in which the first liquid crystal is sealed between a pair of transparent substrates each being provided with segment electrodes and common electrodes, and a second liquid crystal display panel in which the second liquid crystal having a different selected reflection wavelength from the first liquid crystal layer is sealed between a pair of transparent substrates being provided with segment electrodes and common electrodes; folding the two liquid crystal panels connected, at the position of the flexible conductive material and making the same into a stacked body of two liquid crystal display panels; and electrically connecting the common electrodes and segment electrodes of the two liquid crystal display panels to each other.

Herein, the first liquid crystal display panel is produced by disposing the first transparent substrate having segment electrodes provided therein and the second transparent substrate having common electrodes provided therein so as to cause both of the electrodes to be opposed to each other and sealing the first liquid crystal between the transparent substrates, and the second liquid crystal display panel is produced by disposing the third transparent substrate having segment electrodes provided therein and the fourth transparent substrate having common electrodes provided therein so as to cause both of the electrodes to be opposed to each other and sealing the second liquid crystal having a different selected reflection wavelength from the first liquid crystal layer between the transparent substrates.

A description is given of a construction of a liquid crystal display panel according to the invention with reference to FIG. 1, using a liquid crystal display employing a cholesteric liquid crystal as an example. FIG. 1 is a sectional view of a liquid crystal display panel of a cholesteric liquid crystal display and shows a channel of external light incident into the liquid crystal display panel.

Cholesteric liquid crystal layers 3 and 3' are, respectively, provided between the surface side glass substrate 1 and the rear side glass substrate 2, and between the surface side glass substrate 1' and the rear side glass substrate 2'. Top coat layers 4, 4 and alignment layers 4', 4' composed of a polyimide macromolecular film and ITO layers 5, 5 and ITO layers 5', 5', which become electrodes, are, respectively, provided on both sides of the respective liquid crystal layers 3 and 3'. Further, the rear side glass substrate 2 and the surface side glass substrate 1' are connected to each other by an adhesive agent 7. Also, a black layer 6 is provided on the rear side of the rear side glass substrate 2', wherein black paint is coated thereon.

It is assumed that a combination consisting of a surface side glass substrate 1, rear side glass substrate 2, cholesteric liquid crystal layer 3, alignment layers 4, 4, and ITO layers 5, 5 is a liquid crystal display panel. Therefore, FIG. 1 shows a state where two sets of liquid crystal display panels 10 and 20 are stacked. A liquid crystal display according to the invention is such that a circuit, which supplies a current to electrodes 5a, 5a', 5b and 5b' of the liquid crystal display panels 10 and 20 and controls the same, is added thereto.

In FIG. 1, illumination light $I_0$ passes through the surface side glass substrate 1 and is made incident into the cholesteric liquid crystal layer 3. The cholesteric liquid crystal layer 3 has a structure in which liquid crystal particles are twisted, and the center axis of the twisting is called a "helical axis". Bragg's reflection of visible light occurs where the spiral pitch is in a range from 0.25 $\mu$m to 0.46 $\mu$m. Also, the liquid crystal layer 3 has a feature called bistability. A case where the helical axis of the cholesteric liquid crystal layer 3 is in an aligned state close to perpendicularity with respect to the glass substrates (surface side glass substrate 1 and rear side glass substrate 2) is called a planar texture, and a case where the helical axis is in an aligned state almost parallel to the surface of the glass substrates (surface side glass substrate 1 and rear side glass substrate 2) is called a focal conic texture. The two textures are stored in memory when no voltage is supplied.

In the planar texture, reflected illumination light $I_0$ is reflected to the incident direction. In the focal conic texture, the reflected illumination light $I_0$ advances in the direction of the rear side glass substrate 2. The illumination light $I_0$ that has passed through the liquid crystal display panel 10 (hereinafter, this may be called a "blue panel 10") that reflects blue light is made incident into the liquid crystal display panel 20 (hereinafter, this may be called a "yellow panel 20") that reflects yellow light, and light that is reflected by the liquid crystal layer 3 of the planar texture of the yellow panel 20 is reflected in the incident direction.

On the other hand, in the focal conic texture of the blue panel 10, the illumination light $I_0$ that is transmitted in the focal conic texture of the blue panel 10 advances in the direction of the rear side glass substrate 2' of the yellow panel 20 and is absorbed by the rear side black layer (light absorbing layer) 6 of the rear side glass substrate 2', wherein it seems to be black. Since the reflected light of the blue panel 10 and the reflected light of the yellow panel 20 are in a relationship of complementary colors, the reflection color becomes white. Selecting the planar texture and focal conic texture of the liquid crystal layers 3 and 3' enables black and white display.

A reflection liquid crystal display according to the present invention can provide black and white display equivalent to paper inexpensively.

EMBODIMENTS OF THE INVENTION

Figure 1:
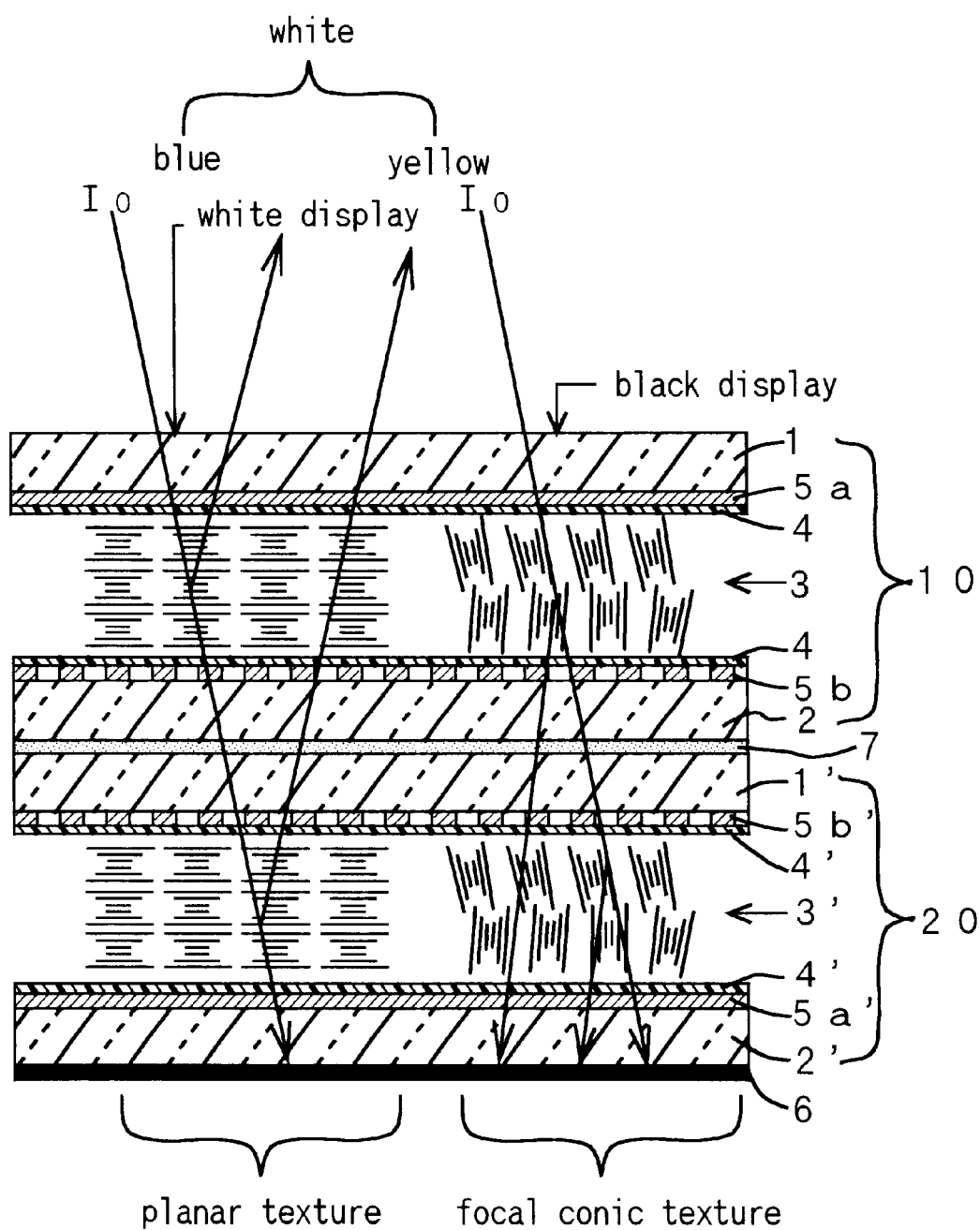
FIG. 1 is a cross-sectional view of a liquid crystal display according to the embodiments of the invention and is a view showing a channel of external light incident into the liquid crystal display.

A description is given of embodiments of the invention with reference to the accompanying drawings.

Representative examples of reflection light that is in a relationship of complementary colors in two liquid crystal display panels are a yellow panel and a blue panel. In the cholesteric liquid crystal, it is possible to obtain a yellow panel and a blue panel by adjusting the amount of a chiral agent that is added to the matrix liquid crystal. In order to drive these two panels by the same driver, it is necessary that the characteristics in a reflection ratio with respect to the drive voltage is made identical to each other or almost the same.

Therefore, the following preparatory experiments 1 and 2 have been commenced in embodiments of the invention.

Preparatory Experiment 1

A liquid crystal display panel was produced, as described below, when stacking two liquid crystal display panels provided with the cross section shown in FIG. 17.

ITO layers $5a$ and $5b$ are supplied to thin glass substrates 1 and 2 (UFF glass of soda lime silica composition, produced by Nippon Sheet Glass Co., Ltd.) having a thickness of 1.1 millimeters for the liquid crystal by spattering respectively. After the ITO layers $5a$ and $5b$ are etched by a photolithography method, homeotropic alignment layers 4 and 4 are, respectively, formed thereon. A glass spacer (not illustrated) is sprayed on one glass substrate 1, and a sealing agent made of epoxy resin is formed (not illustrated) by screen-printing on the other glass substrate 2 in compliance with the shape by which liquid crystal is sealed. These two glass substrates 1 and 2 are opposed to each other and adhered to each other so that the ITO layers $5a$ and $5b$ sides are faced to each other, and the substrates 1 and 2 are heated, thereby hardening the sealing agent, wherein the two glass substrates 1 and 2 are connected to each other by the sealing agent, and a fixed space can be kept by a plastic spacer. The liquid crystal panel substrate is cut off to an appointed size, wherein a cholesteric liquid crystal layer 3 is filled in the space between the two glass substrates 1 and 2 to produce a single liquid crystal display panel.

Similarly, ITO layers $5a'$ and $5b$ and homeotropic alignment layers 4' and 4' are formed on thin glass substrates 1' and 2' (UFF glass of soda lime silica composition, produced by Nippon Sheet Glass Co., Ltd), and a cholesteric liquid crystal layer 3' is filled in the space between two glass substrates 1' and 2' to obtain another liquid crystal display panel.

As described below, liquid crystal layers 3 and 3' having reflection colors of yellow and blue are, respectively, prepared.

A cholesteric liquid crystal layer 3 for selecting and reflecting blue is produced by blending nematic liquid crystal E44 (produced by MERCK & CO.,Inc.) at 70 part sand BL011 (produced by MERCK & CO.,Inc.) at 30 parts, both of which have positive dielectric anisotropy, and further mixing a chiral agent CB15 (produced by MERCK & CO.,Inc.) having right helical twisting power at a ratio of 49.5% by weight.

A cholesteric liquid crystal layer 3' for selecting and reflecting yellow is produced by blending nematic liquid crystal E44 (produced by MERCK & CO.,Inc.) at 70 part sand BL011 (produced by MERCK & CO.,Inc.) at 30 parts, both of which have positive dielectric anisotropy, and further mixing a chiral agent CB15 (produced by MERCK & CO.,Inc.) having right helical twisting power at a ratio of 36.5% by weight.

These are, respectively, filled in empty liquid crystal cells between the above-described glass substrates 1 and 2, and between glass substrates 1' and 2'. The filling port is sealed with TB300 (produced by Three-Bond Corp.) (that is, ultraviolet ray hardening resin). And either cell gap is 5.0 $\mu$m.

Figure 6:
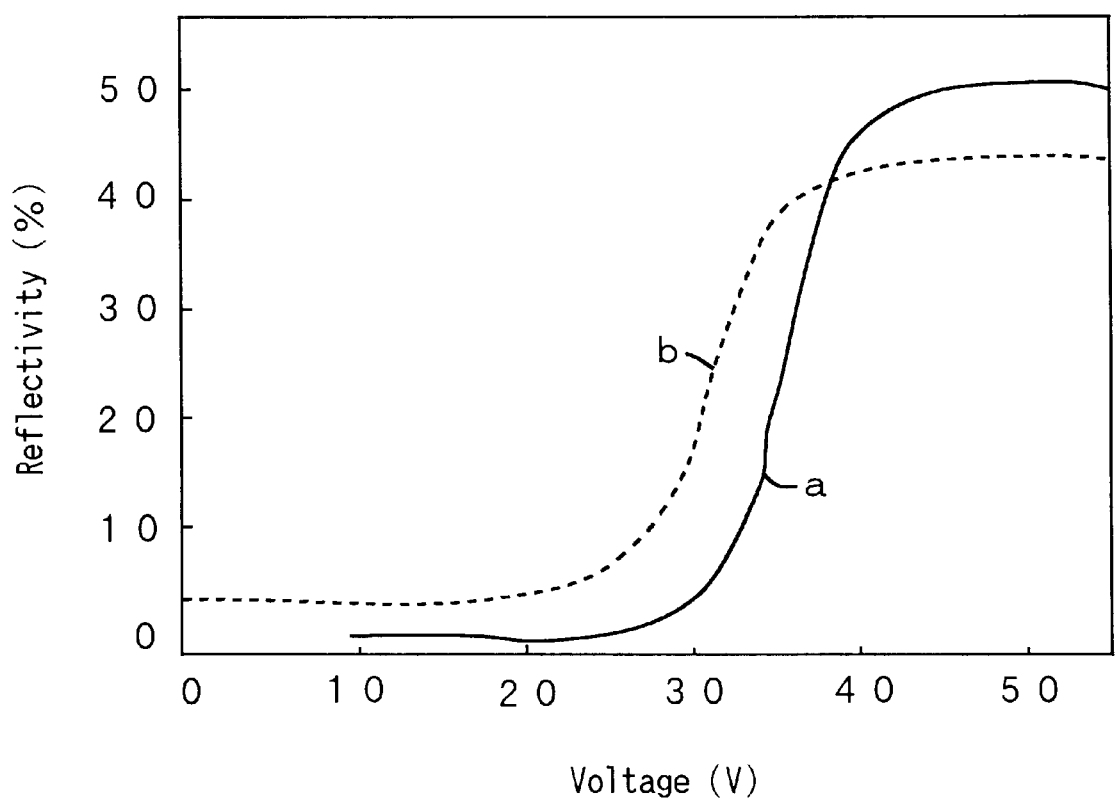
FIG. 6 is a view showing a relationship between voltage and reflectivity of a liquid panel before the voltage and reflectivity characteristics of the blue panel and the yellow panel used for a liquid crystal display obtained by Preparatory Experiment 1 according to the invention is made the same.

The default states of a blue panel 10 consisting of liquid crystal for selecting and reflecting blue and a yellow panel 20 consisting of liquid crystal for selecting and reflecting yellow are made into a focal conic texture, wherein the voltage and reflectivity characteristics were measured by supplying a pulse voltage having a width of 40 ms. The blue panel 10 in which the chiral agent is more added brings about a higher drive voltage by approximately 10% than the yellow panel 20. FIG. 6 shows the relationship between the voltage and the reflectivity of a liquid crystal display panel thus obtained, wherein the voltage and reflectivity characteristics of the blue panel 10 are shown with a solid line a, and those of the yellow panel 20 are shown with a dotted line b.

Figure 17:
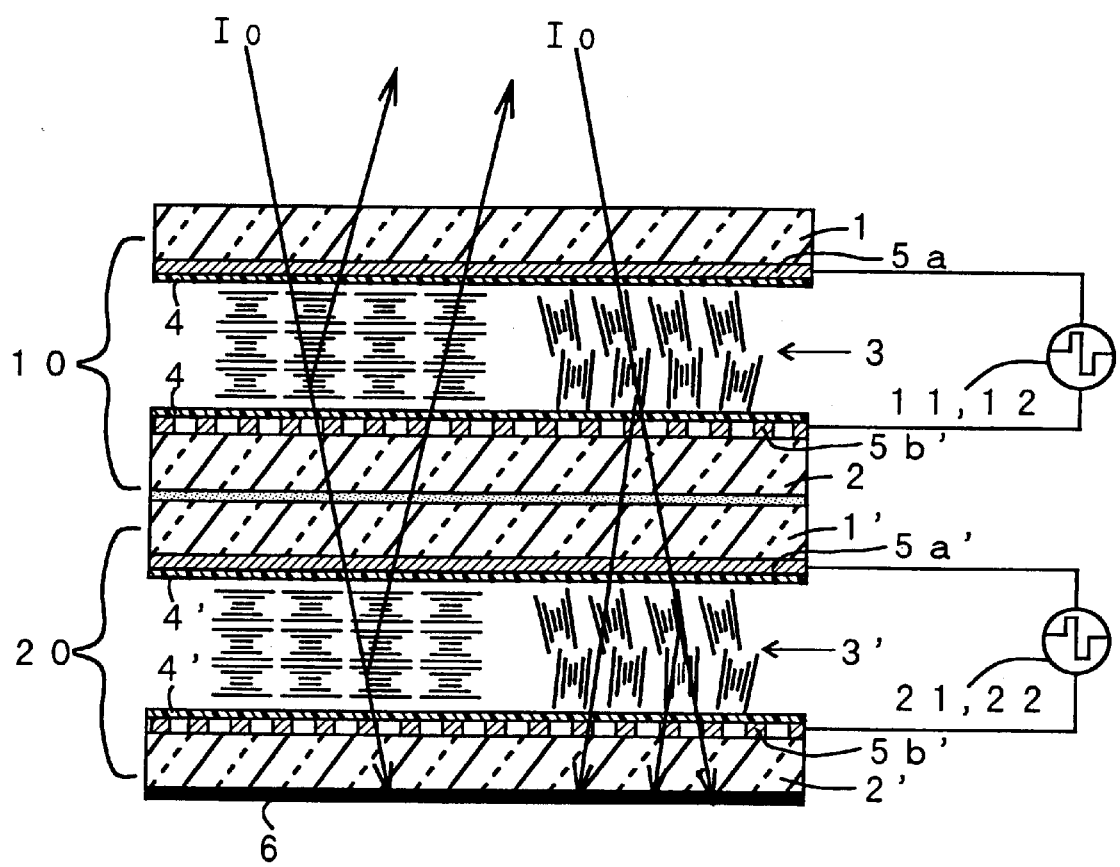
FIG. 17 shows a cross-section of a liquid crystal panel portion of a liquid crystal display shown in FIG. 16, and a view of voltage drive circuits thereof.

FIG. 17 shows a cross section of the liquid crystal panel portion of a liquid crystal display in which the blue panel 10 and the yellow panel 20, both of which were obtained in the above-described producing method, are stacked.

Preparatory Experiment 2

Next, the following experiment was preliminarily carried out.

Figure 16:
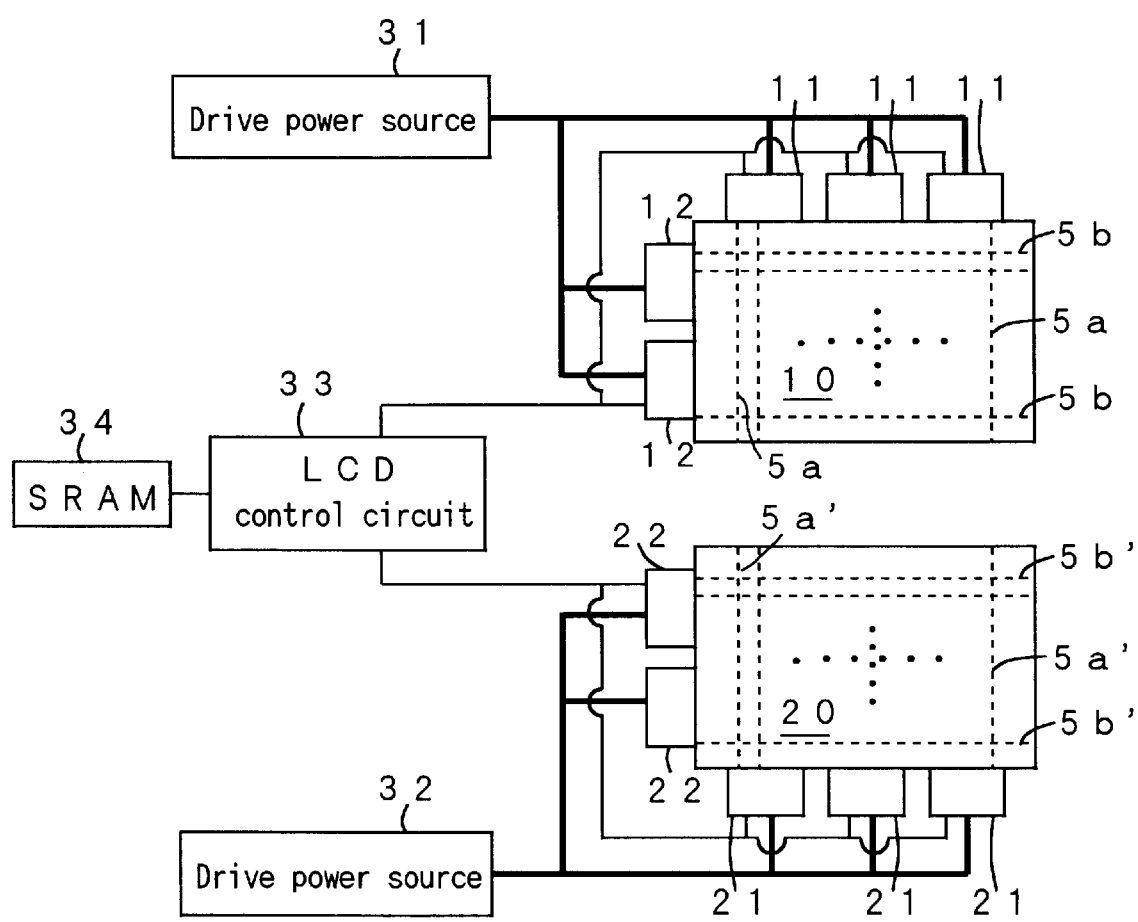
FIG. 16 is a developed view in a case where a voltage drive circuit and an image control circuit are, respectively, connected to both of a blue panel and a yellow panel according to the prior arts.

Voltage drive (driver) circuits 11 and 12 and voltage drive (driver) circuits 21 and 22, to which power is provided from respective drive power sources 31 and 32, are provided for both segment electrodes 5a and 5a' and common electrodes 5b and 5b' of the above-described blue panel 10 and yellow panel 20 as shown in FIG. 16, and an LCD control circuit 33 is connected to the voltage drive (driver) circuit 11 and 12 and voltage drive (driver) circuits 21 and 22, and these are made into a module. And, both panels 10 and 20 are adhered to each other with TB300 (Three-Bond Corp), which is an ultraviolet ray hardening type adhesive agent whose refractive index is close to the refractive index of 1.52 of the glass substrates. Also, Image signals are transmitted from an SRAM 34 to the LCD control circuit 33.

FIG. 17 is a view showing the cross section of the liquid crystal display panel portion of a liquid crystal display in FIG. 16.

As shown in FIG. 17, a black paint is coated on one glass substrate surface of the yellow panel 20 to provide a black layer 6. A pulse voltage that is 45V or more is supplied to these panels 10 and 20, and either liquid crystal layer 3 or 3' is made into a planar texture. When observing from the blue panel 10, it is confirmed that white display is brought about. The results of measurement of spectrum reflectance are shown with a solid line c in FIG. 13.

Figure 13:
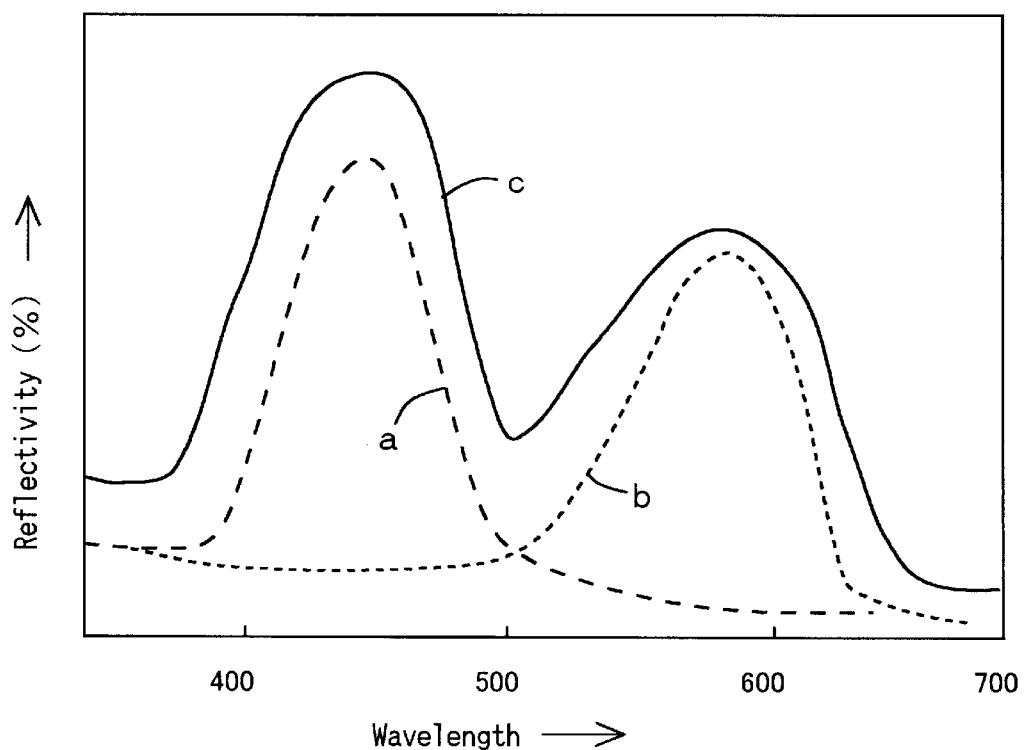
FIG. 13 is a view showing transmissivity of respective wavelengths of the blue panel and the yellow panel according to Embodiment 1 of the invention, and transmissivity of respective wavelengths in a case where the blue panel and yellow panel are stacked.

Also, FIG. 13 shows the relationship between spectral reflectivity and wavelength of the blue panel 10 and the yellow panel 20, using a broken line (a) and a dashed line (b), wherein the peak wavelength of the respective reflectivity exists in the vicinity of approximately 470 nm and 580 nm.

Using the method described in the preparatory experiment 2, two systems are required (one system is provided in the respective liquid crystal panels), which consist of voltage drive (driver) circuits 11 and 12 for driving the liquid crystal layer 3 and voltage drive (driver) circuits 21 and 22 for driving the liquid crystal layer 3'. The cost thereof becomes expensive.

Embodiment 1

The present embodiment attempts to make two systems of voltage drive (driver) circuits, which are required for the above-described preparatory experiment 2, into one system. However, in order to drive the blue panel 10 and yellow panel 20 by a single system of voltage drive (driver) circuits 11 and 12, it is necessary to make the voltage and reflectivity characteristics of two liquid crystal display panels coincident with each other.

Figure 2:
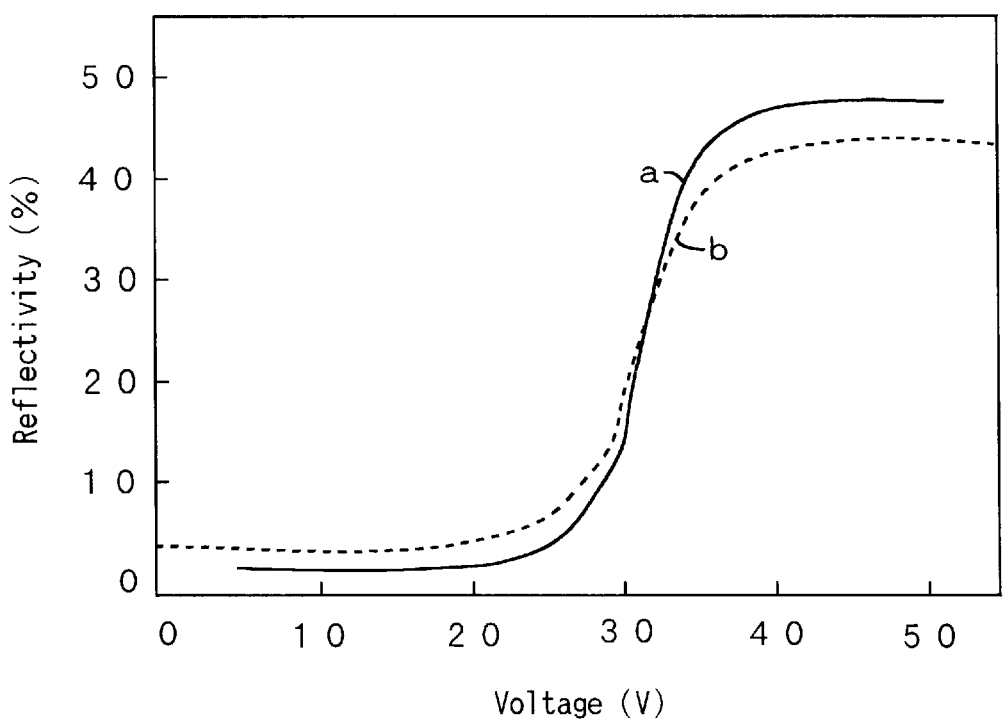
FIG. 2 is a characteristic view of voltage and reflectivity in which the voltage and reflectivity of a blue panel according to Embodiment 1 of the invention are made almost the same as those of a yellow panel by adjusting the cell gap of the blue panel.

By making the cell gap (thickness of the liquid crystal layer 3) of the blue panel 10, which has been obtained in the above-described preparatory experiment 1 and has a higher drive voltage, into 5.0 $\mu$m to 4.5 $\mu$m, the voltage and reflectivity characteristics thereof are made identical to those of the yellow panel 20, which have been obtained in the above-described preparatory experiment 1 (See FIG. 2).

Also, FIG. 1 shows a cross-section and a drive circuit of a liquid crystal display.

The reasons why it is necessary to make the voltage and reflectivity characteristics identical between the blue panel 10 and the yellow panel 20 are described below.

Figure 4:
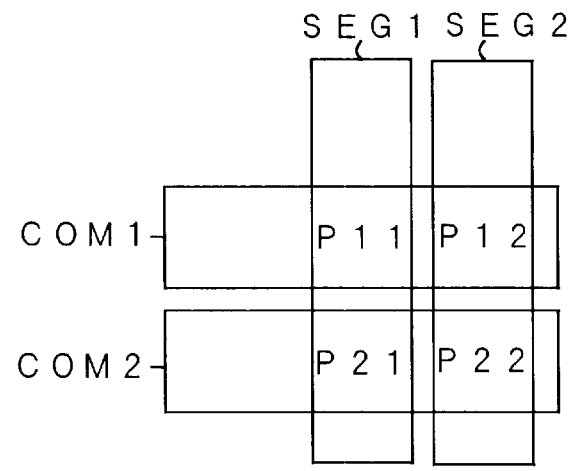
FIG. 4 is a view showing the arrangement of common electrodes and segment electrodes in order to explain the reasons why the voltage and reflectivity characteristics of the blue panel and the yellow panel of a liquid panel that is used for a liquid crystal display according to the invention must be made the same.

In order to simplify the description, a case where two common electrodes (COM) and two segment electrodes (SEG) are provided as shown in FIG. 4 is taken consideration.

In FIG. 4, pixels that are composed of COM1 and SEG1 are regarded as P11 and P12, and pixels that are composed of COM1 and SEG2 are regarded as P21 and P31. And, it is assumed that a blue panel 10 and a yellow panel 20, which have the characteristics shown in FIG. 6, are driven by voltage drive (driver) circuits. First, in order that COM 1 is selected and the pixels P11 and P12 are, respectively, made into a focal conic texture and a planar texture, it is necessary that voltage of 25V and 45V are supplied to the respective pixels P11 and P12. Therefore, –35V is supplied to the COM 1 while –10V and +10V are supplied to the SEG 1 and SEG 2, respectively. Voltage having a rectangular pulse 40 ms wide is supplied. And, a display state of the textures is maintained by memory characteristics peculiar to the cholesteric liquid crystal.

Next, in order that COM 2 is selected, –30V is supplied, and, similarly, the pixels P11 and P12 are, respectively, made into a focal conic texture and a planar texture, –10V and +10V may be supplied to SEG 1 and SEG 2. However, at this time, –10V and +10V voltages are also supplied to the pixels P11 and P12 that have already been written.

Figure 5:
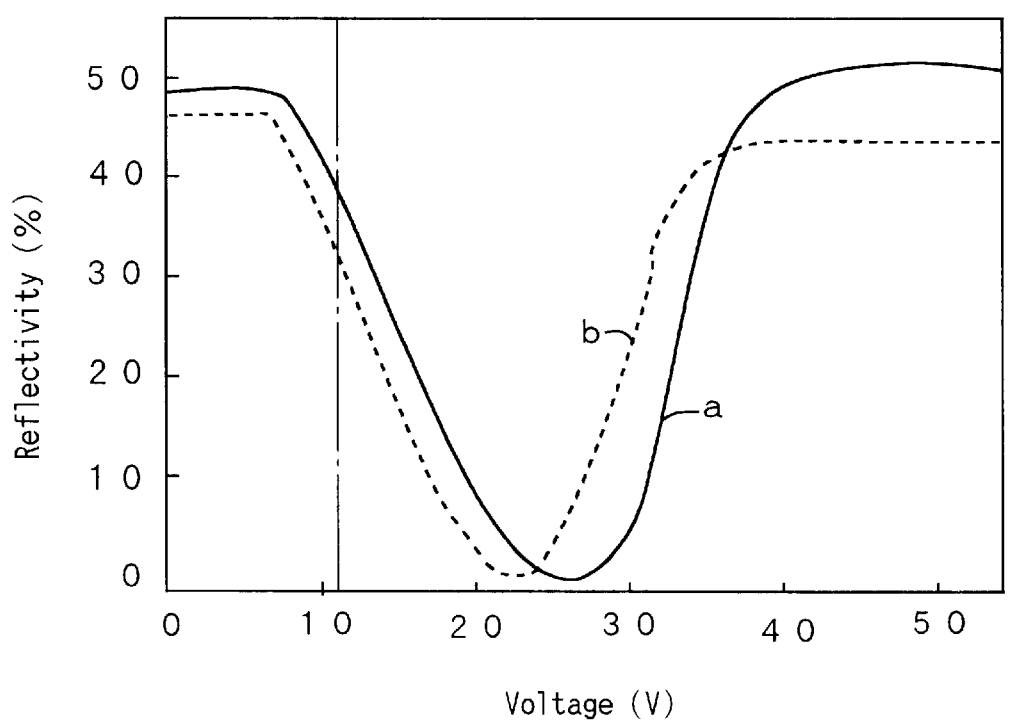
FIG. 5 is a view showing a relationship between voltage and reflectivity when voltage is supplied to the blue panel and the yellow panel having liquid crystal whose default state is in the form of a planar texture, which is used for a liquid crystal display obtained in Preparatory Experiment 1 according to the invention.

Using curved lines a and b, FIG. 5 shows the relationship between voltage and reflectivity when a rectangular pulse voltage having a width of 40 ms is supplied to the blue panel 10 and yellow panel 20, which have liquid crystal whose default state is a planar texture. It is found that the reflectivity is lowered at a voltage of 10V. Therefore, a so-called crosstalk occurs, in which an already-written display portion changes.

Next, a case where a rectangular pulse voltage is supplied with the blue panel 10 and yellow panel 20 having the characteristics shown in FIG. 2 is taken into consideration.

First, COM 1 is selected. In order that pixels P11 and P12 are made into a focal conic texture and a planar texture, it is necessary that voltages of 25V and 35V are supplied to the respective pixels P11 and P12. Therefore, –30V is supplied to the COM 1 while –5V and +5V are supplied to respective SEG 1 and SEG 2. A voltage of rectangular pulse 40 ms wide is supplied. And, the display states are maintained by memory characteristics peculiar to the cholesteric liquid crystal.

Next, COM 2 is selected and a voltage of –30V is supplied. Similarly, in order that the pixels P11 and P12 are made into a focal conic texture and a planar texture, voltages of –5V and +5V are supplied to the respective SEG 1 and SEG 2. At this time, voltages of –5V and +5V are supplied to the respective pixels P11 and P12 that have already been written.

Figure 3:
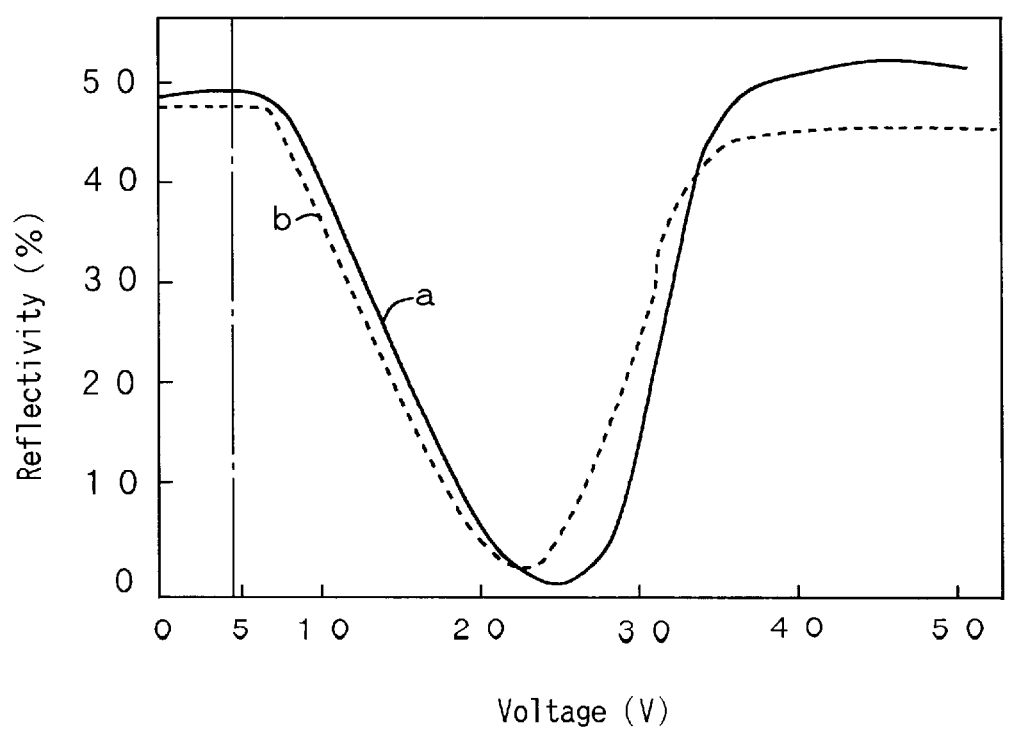
FIG. 3 is a view showing a relationship between voltage and reflectivity when a pulse voltage is supplied to the blue panel and the yellow panel having liquid crystal whose default state is in the form of a planar texture when the blue panel and the yellow panel have the same voltage and reflectivity.

FIG. 3 shows a relationship between voltage and reflectivity when a voltage of rectangular pulse 40 ms wide is supplied to a blue panel 10 and a yellow panel 20, which have liquid crystal layers 3 and 3' whose default state is in the form of a planar texture. The blue panel 10 and the yellow panel 20 are shown with curved lines a and b. It is found that no reflectivity is lowered with a voltage of 5V. That is, no influence is supplied to the display portion that has already been written.

Thus, the blue panel 10 and yellow panel 20 show almost the same voltage and reflectivity characteristics.

As described above, although it is necessary for the blue panel 10 and yellow panel 20 to show the same or almost the same voltage and reflectivity characteristics, in a blue panel 10 and a yellow panel 20 that are stacked in order to obtain black and white display in a liquid crystal display (for example, 800 segment electrodes, 640 common electrodes and vertical angle 4.7 inches) according to the invention, it is sufficient that the reflectivity of both panels 10 and 20 is 0 through 20%, preferably 0 through 15% with a voltage within 0 through 1.5V, preferably, 0 through 1V where the maximum voltage deviation occurs.

A glass substrate 2 of a blue panel 10 and a glass substrate 1' of a yellow panel 20, which have almost the same voltage and reflectivity characteristics as described above, are adhered to each other by an adhesive agent 7 (TB300 (produced by Three-Bond Corp.) being an ultraviolet ray hardening resin) whose reflectivity is 1.52 (FIG. 1). After that, a black paint is coated on the rear side of the glass substrate 2' at the yellow panel 20 side, thereby forming a black layer 6.

Figure 7:
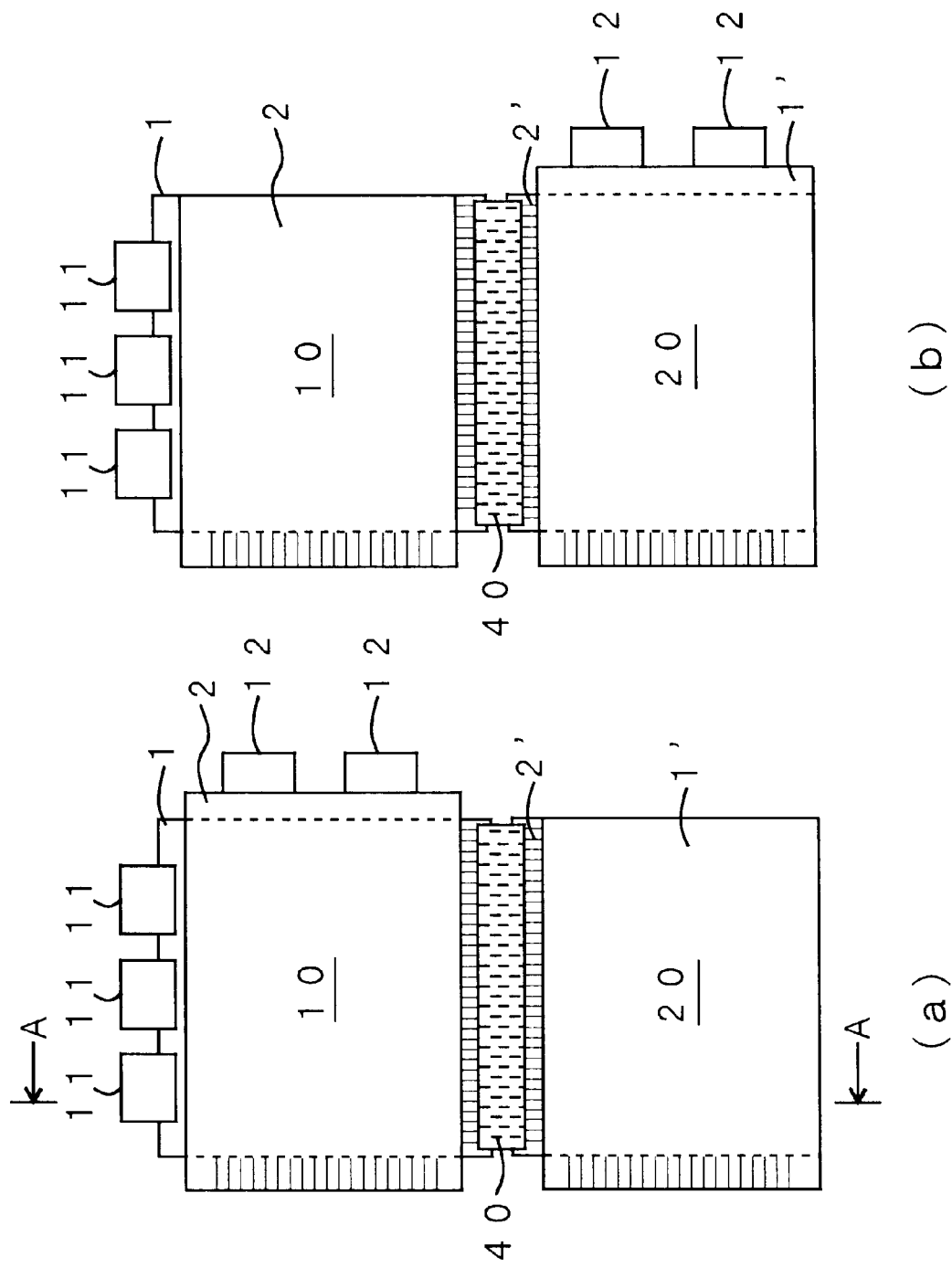
FIG. 7 is a developed configurational view showing a connection method that is brought about by voltage drive circuits, each consisting of a single system, of the blue panel and the yellow panel used for a liquid crystal display according to Preparatory Experiment 1 of the invention.

Next, FIGS. 7(a) and (b) show configurational views of a connection method that is brought about by a voltage drive circuit of one system with respect to the blue panel 10 and yellow panel 20 according to the present embodiment.

First, a description is given of a connection method that is carried out by voltage drive circuits 11, 12, each consisting of a single system, of a blue panel 10 and a yellow panel 20 in FIG. 7(a).

A voltage drive circuit (driver) 11 is connected to the segment electrode sides of the glass substrate 1 of the blue panel 10, and a voltage drive circuit (driver) 12 is connected to the common electrode sides of the glass substrate 2 of the blue panel 10. And, a segment electrode of the glass substrate 2' of the yellow panel 20 is connected, via a flexible printed circuit (hereinafter called an "FPC") 40, to the segment electrode terminal at the opposite side of a connection terminal of the voltage drive circuit 11 of the glass substrate 1 of the blue panel 10. Also, a common electrode of the glass substrate 1' of the yellow panel 20 is connected, via an FPC 50 (see FIG. 10), to a terminal at the opposite side of the connection side of the voltage drive circuit 12 at the common electrode side of the glass substrate 2 of the blue panel 10.

Figure 8:
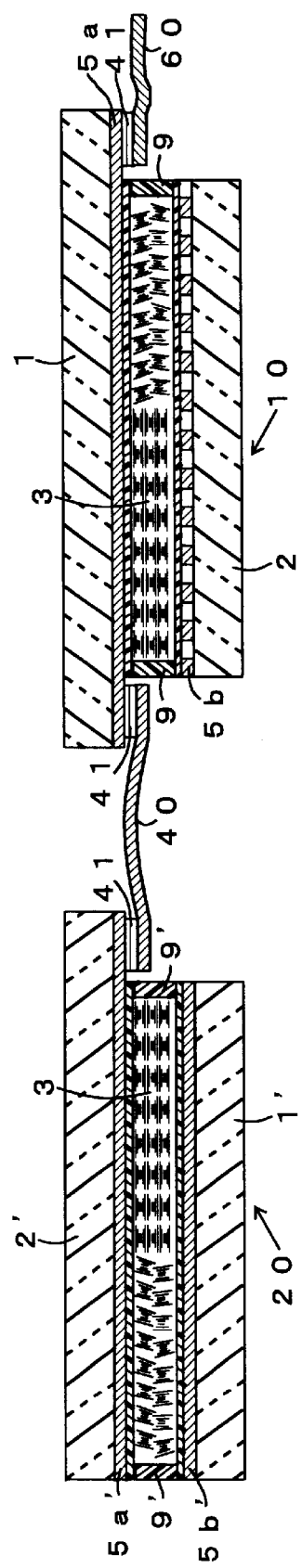
FIG. 8 is a cross-sectional view taken along the line A—A in FIG. 7(a)

FIG. 8 shows a cross-sectional view taken along the line A—A in FIG. 7(a).

The segment electrode 5a of the glass substrate 1 of the blue panel 10 is connected to the segment electrode 5a' of the glass substrate 2' of the yellow panel 20 by an FPC 40. Since the FPC 40 is provided with anisotropic conductive films (hereinafter called an "ACF") 41 and 41, terminals of the respective segment electrodes 5a and 5a' can be easily connected to each other, and since the FPC 40 has bendability, the blue panel 10 and the yellow panel 20 can be stacked each other by bending or folding over the FPC 40. Sometimes, the glass substrate 2 of the blue panel 10 and the glass substrate 1' of the yellow panel 20 are caused to overlap by folding the FPC 40 like a valley. Also, a tape carrier package film (hereinafter called a "TCP") 60 is connected, via the ACF 41, to the terminal of the segment electrode 5a opposite to the connection portion where the glass substrate 1 of the blue panel 10 is connected to the FPC 40, and the terminal of the segment electrode 5a can be connected to the voltage drive circuit 11. The respective liquid crystal layers 3 and 3' are sealed by sealing members 9 and 9' so that the liquid crystal does not leak.

Figure 9:
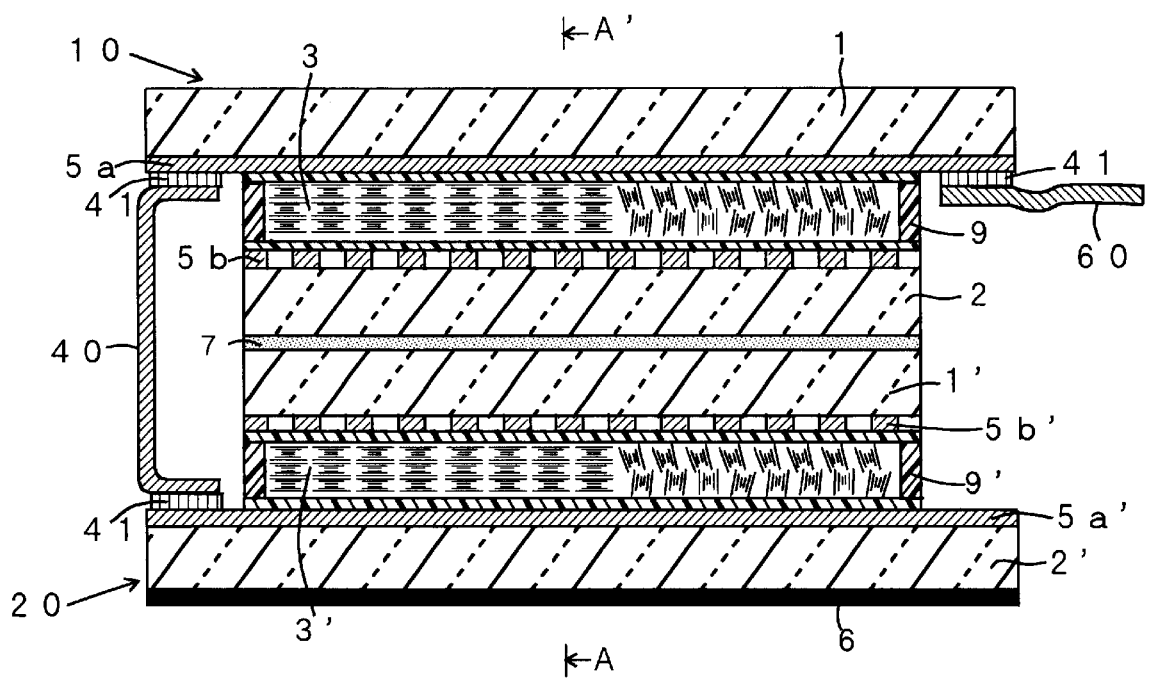
FIG. 9 is across-sectional view of a liquid crystal display according to Embodiment 1 of the invention.

FIG. 9 shows a cross-sectional view of a liquid crystal display that is obtained by stacking the blue panel 10 and yellow panel 20 by folding over the FPC 40 shown in FIG. 8(a) and adhering the glass substrate 2 and glass substrate 1' to each other by an adhesive agent 7.

Figure 10:
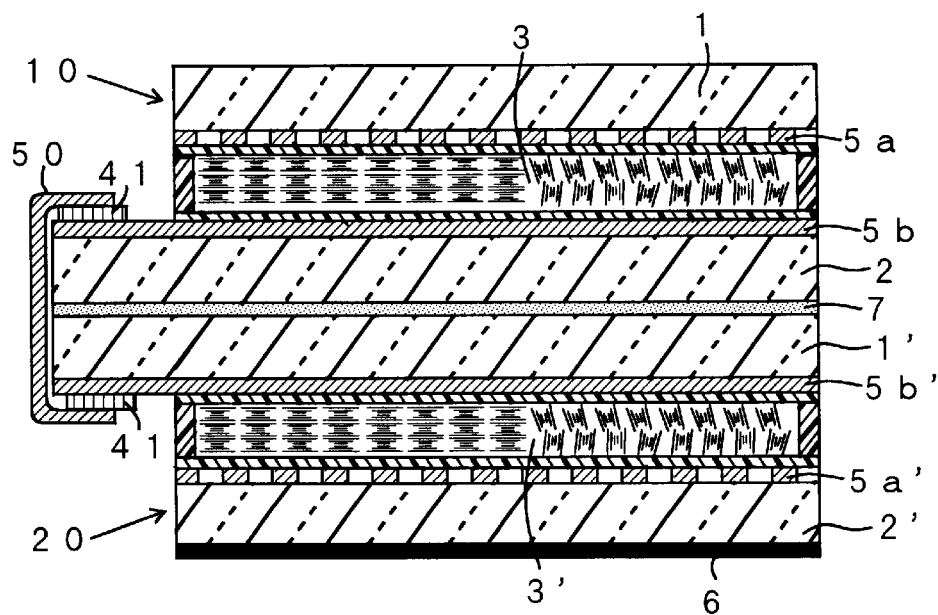
FIG. 10 is a view showing shown by the arrow A—A in FIG. 9.

Also, FIG. 10 shows a cross-sectional view indicated by the arrow A—A in FIG. 9. After the blue panel 10 and the yellow panel 20 are stacked, as shown in a cross-sectional view of FIG. 10, the common electrode 5b of the blue panel 10 and the common electrode 5b' of the yellow panel 20 are connected to each other by the FPC 50 provided with the ACF 41.

Figure 11:
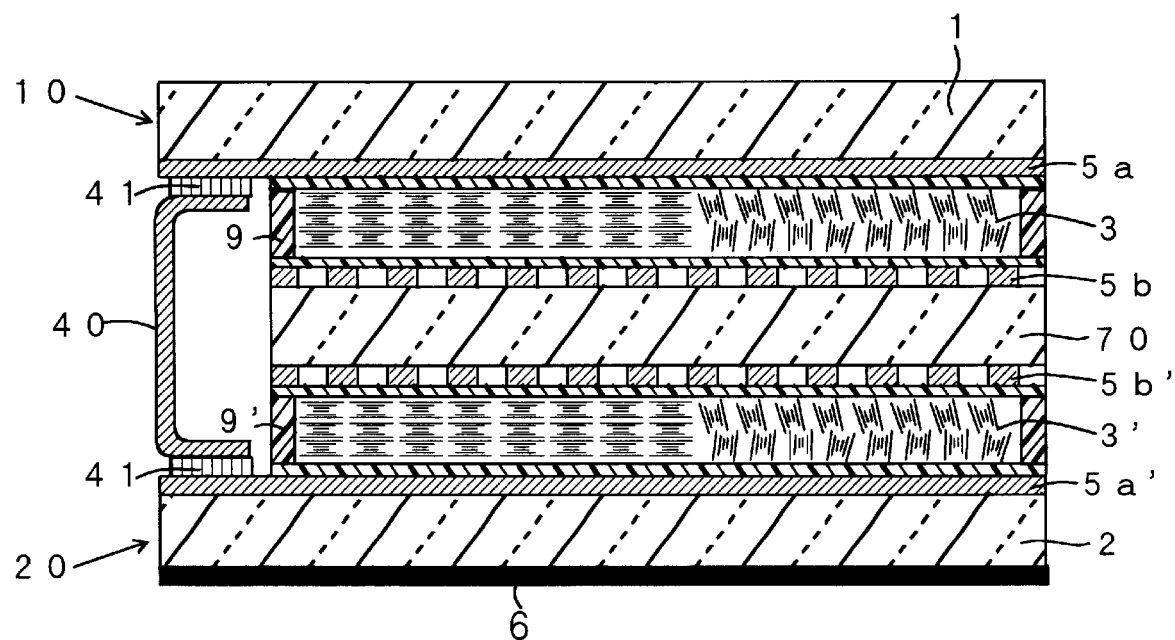
FIG. 11 is a sectional view of a liquid crystal display of a modified version of Embodiment 1 of the invention.

FIG. 11 is an example in which common electrodes 5b and 5b' of the liquid crystal layer 3 of the blue panel 10 and the liquid crystal layer 3' of the yellow panel 20 are, respectively, disposed on both surfaces of one glass substrate 70 in which the glass substrate 2 of the blue panel 10 shown in FIG. 8 through FIG. 10 and the glass substrate 1' of the yellow panel 20 shown therein are integrated together.

Figure 12:
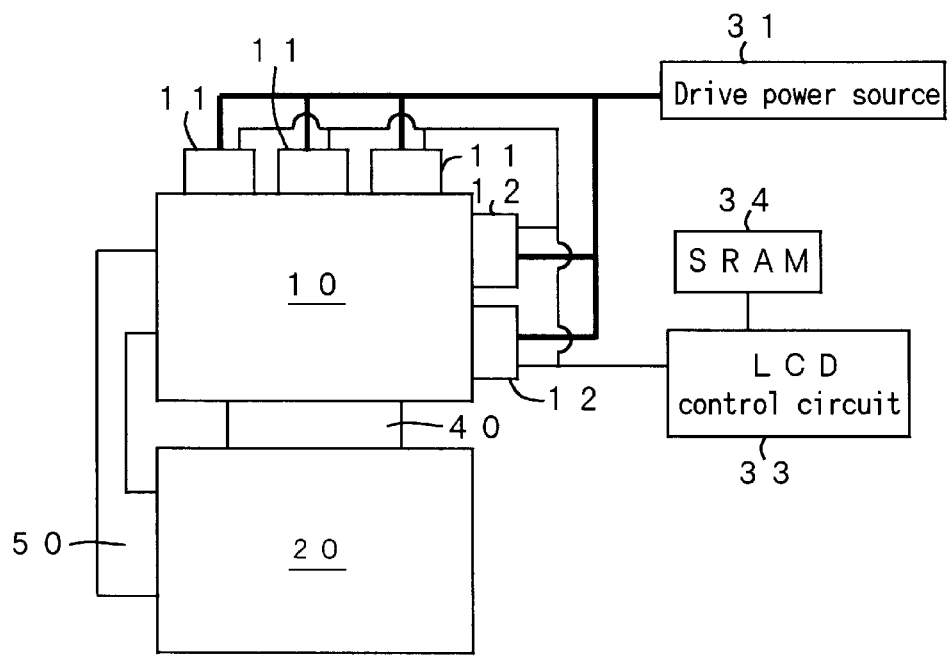
FIG. 12 is a view showing a drive circuit and an image control circuit of a liquid crystal display according to Embodiment 1 of the invention.

FIG. 12 is a configurational view showing connections of a voltage drive circuit 11 of the segment electrodes at the blue panel 10 side of a reflection liquid crystal display according to Embodiment 1, a voltage drive circuit 12 of the common electrode, a drive power source 31 thereof, an LCD controller 33 acting as a circuit for controlling images, and an SRAM (Toshiba TC 55V1001AF (2M)) 34.

Thus, in Embodiment 1, it does not become necessary to provide individual voltage drive circuits 11 and 12 and voltage drive circuits 21 and 22 in each of liquid crystal panels 10 and 20 as in the reflection liquid crystal display according to the prior arts shown in FIG. 16.

Next, a description is given of a connection method that is brought about by a voltage drive circuit (driver) of a single system (a system for carrying out switching actions by signals from one drive power source) of the blue panel 10 and the yellow panel 20 in FIG. 7(b).

In this case, a difference from the connection method shown in FIG. 7(a) resides in that a voltage drive circuit 11 is connected to the segment electrode sides of the glass substrate 1 of the blue panel 10 and a voltage drive circuit 12 is connected to the common electrode sides of the glass substrate 1' of the yellow panel 20. The other configuration is identical to that shown in FIG. 7(a).

Thus, FIG. 13 shows a relationship between spectral reflectivity and wavelengths of the obtained blue panel 10 and yellow panel 20 by a broken line (a) and a dotted line (b). A reflection liquid crystal display according to Embodiment 1, in which the blue panel 10 and the yellow panel 20 are stacked, shows the spectral reflectivity shown by a solid line (c) in FIG. 13, and it is confirmed that black and white display is obtained.

Embodiment 2

Also, a method for making the voltage and reflectivity characteristics of the blue panel 10 and yellow panel 20 coincident with each other is attempted by adjusting the liquid crystal composition. Nematic liquid crystal MLC6657 (produced by MERCK & CO., Inc) having a lower drive voltage is mixed with matrix liquid crystal of the blue panel 10, which has a higher drive voltage, at 70 parts, and E44 (produced by MERCK & CO.,Inc) is also mixed therewith at 30 parts, wherein a right helical twisting power chiral agent CB15 (produced by Merk) is set to 49.0% by weight.

A cholesteric liquid crystal for selecting and reflecting yellow is produced by blending nematic liquid crystal E44 (produced by MERCK & CO.,Inc.) at 70 parts and BL011 (produced by MERCK & CO.,Inc.) at 30 parts, both of which have positive dielectric anisotropy, and further mixing a chiral agent CB15 (produced by MERCK & CO.,Inc.) having right helical twisting power at a ratio of 36.5% by weight.

These are, respectively, filled in empty liquid crystal cells between the glass substrates 1 and 2 shown in FIG. 1 or FIG. 16, and between glass substrates 1' and 2'. The filling port is sealed with ultraviolet ray hardening resin. And either cell gap is 5.0 μm.

With the blue panel 10 and yellow panel 20 obtained, voltage and reflectivity characteristics that are almost the same as those shown by the curved lines in FIG. 2 are, respectively, obtained.

The above-described blue panel 10 and yellow panel 20 are stacked by a method that is almost the same as that in Embodiment 1, and voltage drive circuits 11 and 12 of a single system, and an LCD controller 33, which are the same as those in Embodiment 1, are assembled to produce a reflection liquid crystal display, wherein it is confirmed that black and white display images are obtained.

Embodiment 3

A liquid crystal display according to the present embodiment can bring about a blue panel 10 and a yellow panel 20, which have almost the same voltage and reflectivity, by a method composed of circuit configuration.

Figure 14:
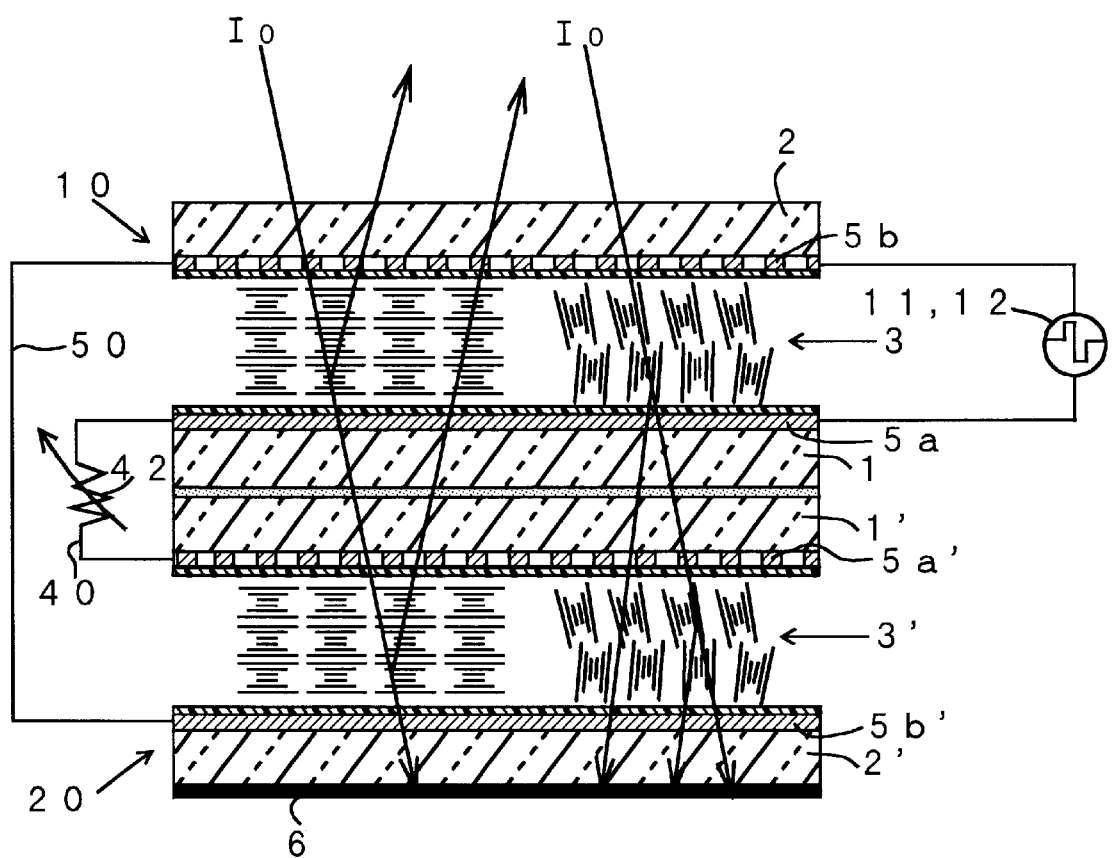
FIG. 14 shows a sectional view of a liquid crystal display according to Embodiment 3 of the invention and a view of a voltage drive circuit thereof.

The blue panel 10 and yellow panel 20 that have been obtained by Preparatory Experiment 1 and have different voltages and reflectivity, are stacked by a method that is almost the same as that in Embodiment 1, and voltage circuits 11 and 12 are connected to the common electrode 5b side and segment electrode 5a side of the blue panel 10 by serial connections shown in FIG. 14. And, a terminal of the common electrode 5b at the opposite side of the connected side where the voltage drive circuit 11 of the common electrode 5b of the blue panel 10 is connected to the common electrode 5b' of the yellow panel 20 by the FPC 50, whereby an FPC 40 having a resistance value of approximately 2.5MΩ is connected between terminals of the segment electrodes 5a and 5a' of the blue panel 10 and the yellow panel 20.

The voltage that flows into the obtained liquid crystal display was approximately 2 μA per line. Since a difference in drive voltage between the blue panel 10 and the yellow panel 20 is approximately 5V, the FPC 40 is caused to have a resistor 42 of approximately 2.5 MΩ, where by the voltage supplied through the blue panel 10 is lowered, and a voltage suitable for the yellow panel 20 is supplied to bring about optimal black and white display.

Embodiment 4

Figure 15:
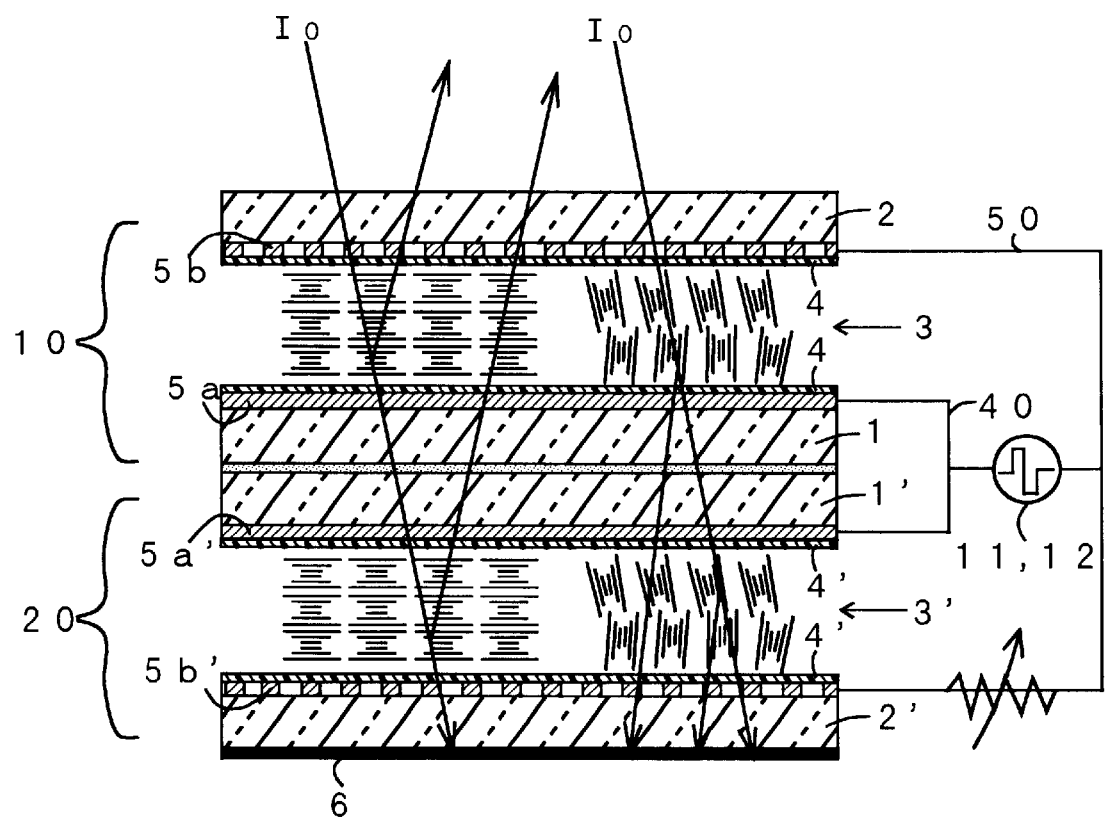
FIG. 15 shows a sectional view of a liquid crystal display according to Embodiment 4 of the invention and a view of a voltage drive circuit thereof.

The circuit configuration of a liquid crystal display according to the present embodiment shown in FIG. 15 is such that the segment electrode 5a of the blue panel 10 is connected to the segment electrode 5a' of the yellow panel 20 by an FPC 40 while the common electrode 5b of the blue panel 10 is connected to the common electrode 5b' of the yellow panel 20 by an FPC 50. At this time, by disposing a resistor of approximately 2.5 MΩ at the FPC 50, it becomes possible to use voltage drive circuits 11 and 12 each consisting of a single system. Thus, black and white display can be obtained.

Further, in the respective embodiments, examples in which glass substrates 1, 2, 1' and 2' have been used as transparent substrates are shown. However, any material may be employed if it is transparent and has electrical insulation characteristics between adjacent electrodes of a plurality of electrodes 5a, 5b, 5a' and 5b'. Preferable materials of substrates may be inorganic glass substrates such as 7059 glass substrates and soda glass substrate, and organic macromolecular compounds such as polyethylene terephthalate, polycarbonate, polyethersulfone, triacetylcellulose, polyvinyl chloride, norbornane-based polymer, etc.

In addition, preferable materials for transparent electrodes 5a, 5b, 5a' and 5b' may be transparent metal oxide such as indium oxide, tin oxide, indium tin oxide, etc.

In the above-described embodiments of the invention, a description was given of a liquid crystal display that can bring about black and white display by stacking a blue panel 10 and a yellow panel 20. However, the present invention is not limited to this case. The invention includes a liquid crystal display that brings about black and white display by stacking two panels that are in other complementary color relationship, and a liquid crystal display that brings about color display images by stacking color panels of other color tones, which are not limited to the complementary color relationship.

What is claimed is:

1. A reflection liquid crystal display including two liquid crystal layers having selected reflection wavelengths differing from each other, and two pairs of liquid crystal display panels each provided with a pair of transparent electrodes between which said respective liquid crystal layers are placed, and being obtained by stacking said two pairs of liquid crystal display panels;
   wherein said pairs of electrodes are electrically connected, and a voltage supply between the pair of electrodes of one liquid crystal display panel and a voltage supply between the pair of electrodes of the other liquid crystal display panel are provided by a common voltage drive circuit;
   a fixed or variable resistor for adjusting fluctuation characteristics of a reflection ratio with respect to drive voltages supplied between said pairs of electrodes of said two liquid crystal layers so as to be substantially identical to each other or almost the same, is provided in a voltage drive circuit of a liquid crystal layer having a smaller rise voltage in the fluctuation characteristics of said reflection ratio with respect to said liquid crystal layers.

2. The reflection liquid crystal display as set forth in claim 1, wherein the selected reflection wavelengths of said two liquid crystal layers are made in the relationship of complementary colors, and the color tone of said reflection light is made into black and white colors.

3. The reflection liquid crystal display as set forth in claim 1 or 2, wherein said liquid crystal layers are formed of any one of cholesteric liquid crystal, chiral nematic liquid crystal, liquid crystal in which the former two are blended together, and holographic polymer dispersed liquid crystal.

4. The reflection liquid crystal display as set forth in claim 3, wherein said liquid crystal layer is formed of chiral nematic liquid crystal.

5. The reflection liquid crystal display as set forth in claim 1, wherein the fluctuation characteristics of the reflection ratio with respect to said drive voltages are adjusted by making the thickness of a liquid crystal layer having a larger rise voltage in the fluctuation characteristics of said reflection ratio, wherein it is assumed that the thickness of said two liquid crystal layers are the same, thinner than the thickness of a liquid crystal layer having a smaller rise voltage in the fluctuation characteristics of the other said reflection ratio.

6. The reflection liquid crystal display as set forth in claim 1, wherein said two liquid crystal layers are formed of a mixture that contains nematic liquid crystal and a chiral agent, the fluctuation characteristics of the reflection ratio with respect to said drive voltages are adjusted by varying types of said nematic liquid crystal and chiral agent and/or mixture ratio thereof.

7. A reflection liquid crystal display including two liquid crystal layers having selected reflection wavelengths differing from each other; pairs of transparent electrodes consisting of segment electrodes and common electrodes between which said respective liquid crystal layers are placed; and two sets of liquid crystal display panels provided with pairs of transparent substrates between which said pairs of transparent electrodes are placed; and being obtained by stacking respective segment electrodes and common electrodes of said two sets of liquid crystal display panels so as to be disposed at positions parallel to each other;

wherein said reflection liquid crystal layer further comprises an electrical connecting means for connecting said segment electrodes of the respective liquid crystal display panels to each other; an electrical connecting means for connecting said common electrodes of the respective liquid crystal display panels; and a voltage drive circuit of a single system, which supplies a voltage between the respective segment electrodes and common electrodes via said two electrical connecting means.

8. The reflection liquid crystal display as set forth in claim 7, wherein said electrical connecting means are composed of a flexible material.

9. The reflection liquid crystal display as set forth in claim 8, wherein said flexible material is an FPC (Flexible Printed Circuit).

10. The reflection liquid crystal display as set forth in any one of claims 7 through 9, wherein a power circuit and a voltage controlling circuit for picture display are connected to said voltage drive circuit.

11. The reflection liquid crystal display as set forth in claim 7, wherein an overlapping plane of adjacent transparent substrates of said two sets of liquid crystal display panels are adhered to each other with an adhesive agent whose refractive index is almost the same as the refraction index of said transparent substrate.

12. A method for producing a reflection liquid crystal display, comprising the steps of:

electrically connecting segment electrodes of the respective liquid crystal display panels, by flexible electrical connecting materials, said respective liquid crystal display panels being composed of a first liquid crystal display panel in which the first liquid crystal is sealed between a pair of transparent substrates each being provided with segment electrodes and common electrodes, and a second liquid crystal display panel in which the second liquid crystal having a different selected reflection wavelength from said first liquid crystal layer is sealed between a pair of transparent substrates being provided with segment electrodes and common electrodes;

folding said two liquid crystal panels connected, at the position of said flexible electrical connecting material and making the same into a stacked body of two liquid crystal display panels; and electrically connecting the common electrodes of said two liquid crystal display panels to each other.

13. The method for producing a reflection liquid crystal display as set forth in claim 12, wherein said first liquid crystal display panel is produced by disposing the first transparent substrate having segment electrodes provided therein and the second transparent substrates having common electrodes provided therein so as to cause both of said electrodes to be opposed to each other and sealing the first liquid crystal between said transparent substrates, and the second liquid crystal display panel is produced by disposing the third transparent substrate having segment electrodes provided therein and the fourth transparent substrate having common electrodes provided therein so as to cause both of said electrodes to be opposed to each other and sealing the second liquid crystal having a different selected reflection wavelength from said first liquid crystal layer between said transparent substrates.

14. The method for producing a reflection liquid crystal display as set forth in claim 13, wherein the flexible material is an FPC (Flexible Printed Circuit).

* * * * *